United States Patent [19]

Sessa et al.

[11] Patent Number: 4,842,890

[45] Date of Patent: Jun. 27, 1989

[54] METHOD FOR COATING FASTENERS

[75] Inventors: Eugene D. Sessa, Mt. Clemens; Richard Duffy, Utica, both of Mich.

[73] Assignee: Nylok Fastener Corporation, Rochester, Mich.

[21] Appl. No.: 70,416

[22] Filed: Jul. 7, 1987

[51] Int. Cl.$^4$ .............................................. B05D 3/14
[52] U.S. Cl. ...................................... 427/47; 427/195; 427/196; 427/318; 427/322; 427/425
[58] Field of Search ................ 427/47, 185, 189, 287, 427/318, 435, 425, 322, 195, 196

[56] References Cited

U.S. PATENT DOCUMENTS 4,120,993 10/1978 Duffy et al. ..................... 427/318 X Primary Examiner—Bernard P. Pianalto
Attorney, Agent, or Firm—Niro, Scavone, Haller & Niro, Ltd.

[57] ABSTRACT

A method and apparatus for coating a fastener, particularly a fastener with a head portion and shank portion, with a coating material is provided. The invention includes the steps of and apparatus for supporting the fasteners such that the fasteners are positioned for coating. The fasteners are conveyed such that the fasteners are moved through a plurality of operation stations and pass through a heating station where the shank portions of the fasteners are heated. Subsequently, at a material applying station, a coating material is applied to the heated shank portions. A preferred embodiment of the method and apparatus of the present invention includes supporting the fasteners on their head portions with the shank portions projecting upward, conveying the fasteners with their shank portions projecting upward for processing, heating the shank portion to a temperature above the melting point of the applied material and applying the material to the heated shank portion to form a coating thereon.

10 Claims, 4 Drawing Sheets

METHOD FOR COATING FASTENERS

TECHNICAL FIELD OF THE INVENTION

This invention relates to a method for coating fasteners and more particularly to an improved method for coating fasteners, having shank and head portions, with a powder material.

BACKGROUND OF THE INVENTION

Numerous methods and devices have been employed in the past for coating fasteners. Some of these methods and devices are useful in coating certain types of fasteners, but are not as versatile as may be necessary to coat other types of fasteners.

Examples of such methods and devices include U.S. Pat. No. 3,452,714 in the names of G. F. C. Burke, Richard J. Duffy et al., U.S. Pat. No. 4,120,993 to Richard J. Duffy et al., and U.S. Pat. No. Re. 28,812 to Richard J. Duffy, one of the present inventors. The methods and devices disclosed in these United States Patents provide for the coating of fasteners in which the shank portion of the fastener depends below a pair of traveling belts. The fasteners are supported on the belts at their head portion. These methods and apparatus prove very efficient for coating fasteners which are void of projections depending downwardly from the head portion of the fastener, since such fasteners may be positioned with the shanks between the belts and remain in a stable position for coating. However, these methods and apparatus prove somewhat inefficient and less versatile than required when fasteners including projections depending downwardly in the direction of the shank portion are to be coated as well as rotated during the coating process. Fasteners including such projections are not readily placed in a stable position with their shank portions projecting downward between the belts and can not be easily and efficiently coated in this configuration. Furthermore, the methods and apparatus of the previously described patents do not provide the ability to precisely control the linear speed and rotation of the fasteners during the coating process.

Thus, it would be advantageous to provide a method and apparatus which coated a large variety of fasteners, including fasteners having projections depending downwardly from the head portion of the fastener, in a cost efficient, versatile and continuous manner. Further, it would be advantageous to provide a method and apparatus which would automatically and rapidly coat a wide variety of fasteners, including those fasteners having projections depending downwardly from their head portion.

It would also be advantageous to provide a method and apparatus which accommodates a variety of fastener sizes and which could be quickly and easily adapted for coating various sizes of both male and female fasteners. In addition, it is desirable to provide a method and apparatus which has the versatility to coat a specified portion of the threads of the fastener, as well as the complete threaded area, and further, a method and apparatus which may coat only a specific portion of the radial distances about the threaded surface of the fastener. Furthermore, it would be advantageous to provide a method and apparatus which provides the ability to precisely control the linear speed and rotation of the fasteners to be processed in both a shank up as well as a shank down orientation.

SUMMARY OF THE INVENTION

In accordance with the present invention, a method for coating one or more fasteners having head and shank portions with a powder material is provided. The method includes the steps of supporting the fastener for processing and heating the shank portion to a temperature above the melting point of the powder material to be applied. The method also includes the step of applying the powder material to the heated shank portion of the fastener to coat the fastener.

In a preferred embodiment of the method of the present invention, the fastener to be processed is rotated at least 360 degrees while the powder material is being applied to the heated shank portion of the fastener. This may be effected by subjecting the fastener to a magnetic field during application of the powder material to increase the drag imparted to the fastener thereby causing its controlled positive rotation. Further, a preferred embodiment of the present method also includes the step of collecting powder material which is not applied to the fastener during application of the powder material. This applied powder is collected and reused for future coating applications.

In applying the powder material, a preferred method contemplates spraying the powder material on the heated shank portion of the fastener. In order to provide 360 degree coverage of at least a portion of the shank, the powder material is sprayed from at least two spray locations spaced from one another. Another preferred method contemplates linearly conveying the fasteners supported on their head portions with the shank portions projecting upward.

The apparatus practicing the method of the present invention provides a member for supporting the fasteners for coating. A conveying member is also provided to controllably advance the fasteners during coating. A heating element is provided for heating the fastener as well as a material applicator for applying the material to the fastener.

In a preferred embodiment, the apparatus also includes a cooling station for cooling the heated fasteners which may also include a rust preventative to maintain the quality and finish of the coated fasteners. Further, the supporting member may include a linearly traveling conveying member and more preferably a pair of endless traveling belts which are supported throughout a major portion of their length and on which the head portion of the fastener rests. In order to provide a 360 degree coating on the fastener and to effect rotation of fasteners during the coating operation, a preferred embodiment of the apparatus may include one of the pair of traveling belts having a coefficient of friction less than the other belt, the belts being movable in the same direction at different speeds and/or the belts being movable in opposite directions at various speeds. Furthermore, in a preferred embodiment, one belt of the pair of belts may be wider than the other and one of the belts may be provided with cradle members to effect the desired supporting and conveying characteristics. Moreover, it may be desirable to provide belts which are adjustable such that at least one of the belts is positionable with respect to the other to accommodate a variety of fastener sizes, including a plurality of fastener head and shank portion sizes and shapes.

Thus, the invention provides the versatility for coating a wide variety of fasteners, including those fasteners having projections depending from the head portion of the fastener, which have previously been difficult to coat. The present invention provides a simple, rapid, inexpensive method and apparatus for coating a wide variety of fasteners, including those fasteners having projections depending downward from their head portion which require that the fastener be supported on their heads with the shanks projecting upwardly to ensure a proper and uniform coating process.

These and other advantages of the present invention will become apparent to those skilled in the art from the detailed disclosure of the present invention as set forth below.

BRIEF DESCRIPTION OF THE DRAWINGS

The novel features of the invention are set forth in the appended claims. The invention itself, however, together with further attendant advantages thereof, will be best understood by reference to the following description taken in conjunction with the accompanying drawings in which:

DESCRIPTION OF THE PREFERRED EMBODIMENTS

The present invention will be described in relation to coating studs which include a head portion, a shank portion and a plurality of projections depending downwardly from the head portion parallel to the central axis of the shank portion. However, it is to be understood that the present invention is useful in coating a variety of fasteners, including, but not limited to, screws, bolts, studs and similar externally threaded articles. Furthermore, it may be appreciated by those skilled in the art that the present invention may have advantages and may be used to provide a coating on a wide variety of internally threaded articles including, but not limited to, nuts, collars and the like.

The present method and apparatus may also be used to apply a variety of coatings to fasteners. Such coatings include, but are not limited to, non-conductive coatings, lubricating coatings, a combination of both non-conductive and lubricating coatings as well as similar types of coatings. Furthermore, such coating materials may include, but are not limited to, thermoplastic or thermosetting materials. Specifically, such coatings may include, but are not limited to nylon, acrylic, as well as fluorocarbon and polyethylene based materials. An example of such a material is manufactured by Du Pont Corporation and is distributed under the trademark Teflon-P.

Figure 1:
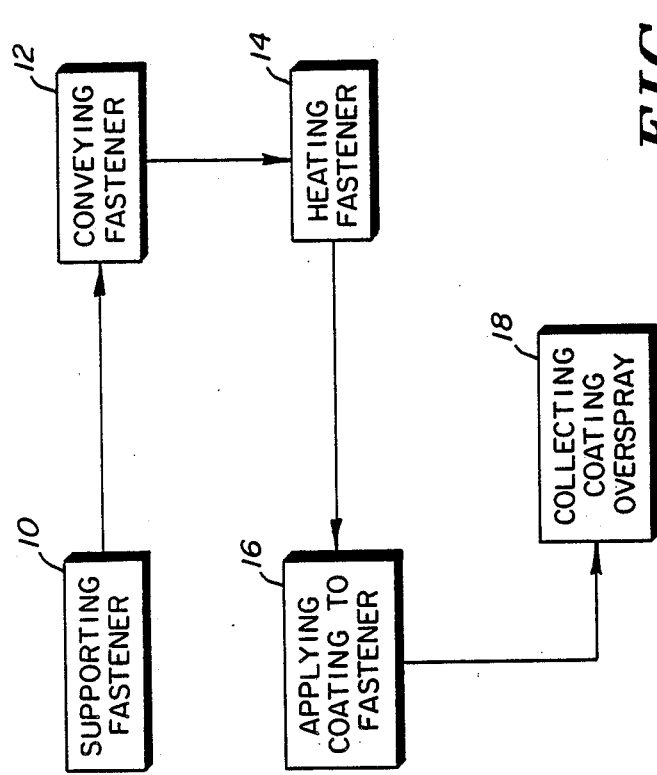
FIG. 1 is a block diagram illustrating the steps of the present invention.

As shown in the block diagram of FIG. 1, a method of coating a fastener having a head and shank portion with powder material includes the steps of supporting the fastener as illustrated at step 10. As may appreciated by those skilled in the art, the fastener may be supported on its head portion such that the shank portion projects upward away from the supporting structure or downward through the supporting structure. For the purposes of illustration only, the present invention will be described with the fastener being supported on its head portion with the shank portion projecting upward away from the supporting structure.

The fasteners are conveyed with the shank portions projecting upward for processing at step 12. At step 14, the shank portions of the fasteners are preferably heated to a temperature above the melting point of the powder material and the powder material is applied to the heated shank portion of the fastener at step 16. As further illustrated in FIG. 1, the method of the present invention may include the step of collecting the powder material which is not applied to the fastener at step 16. Accordingly, the overspray of powder material may be collected and used for subsequent processing at step 18.

The overall method of coating, as well as the specifics relating to the method, will be described in conjunction with the exemplary apparatus illustrated in FIGS. 2 through 5. It will be understood by those skilled in the art that additional and/or modified apparatus, other than the specific apparatus shown herein, may be used to carry out and practice the present invention. Furthermore, it will be understood by those skilled in the art that the method of the present invention may also be practiced in the instance where individual fasteners may be coated in single station test apparatus or by hand. For the purposes of illustration only, the present invention will also be described in conjunction with the coating of weld studs, but it should be understood that a wide variety of fastener types may be coated by and enjoy the advantages of this invention.

Figure 2:
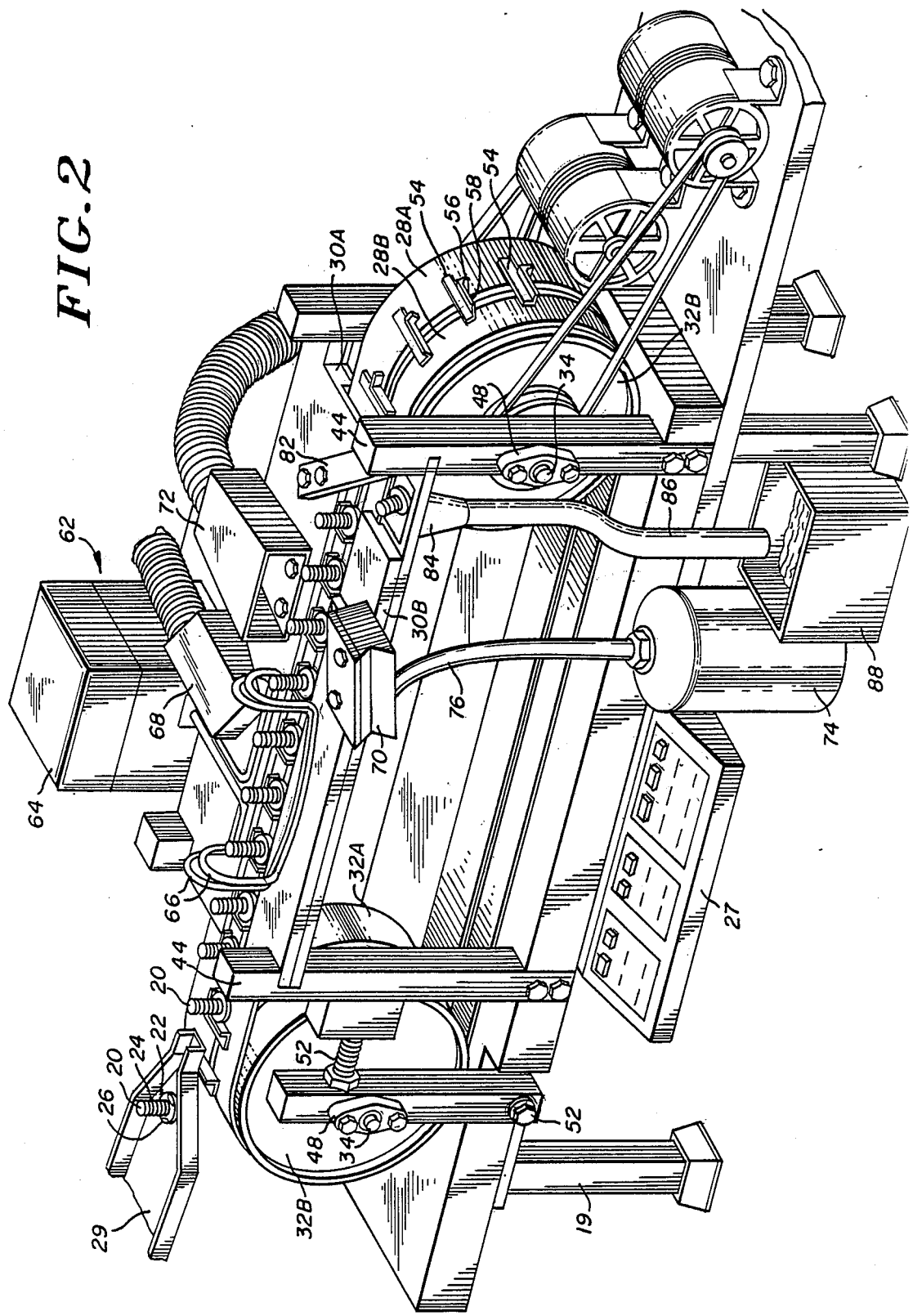
FIG. 2 is a perspective view of one embodiment of the apparatus of the present invention.
Figure 3:
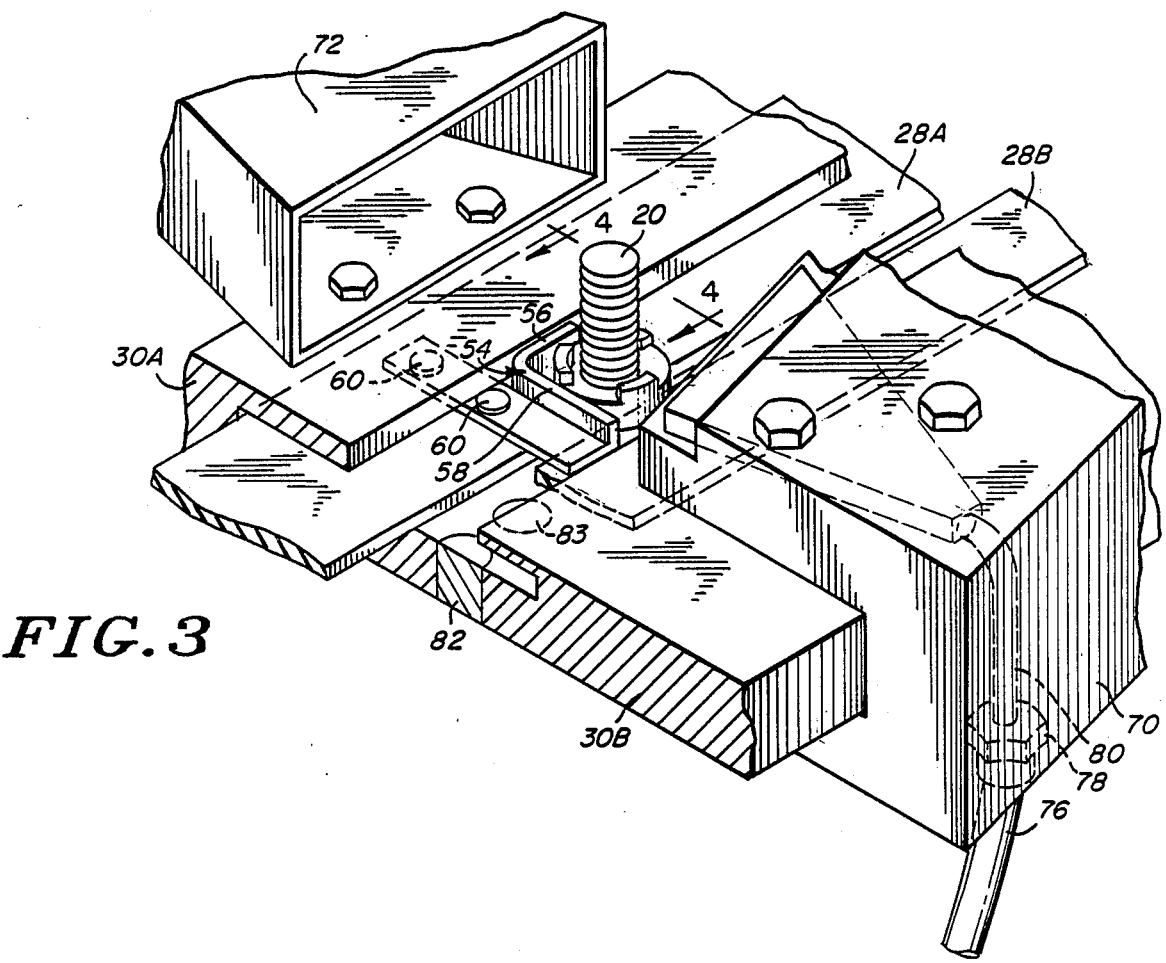
FIG. 3 is an enlarged perspective view of a portion of the apparatus of FIG. 2 illustrating the fastener, as it is being coated with powder material.
Figure 4:
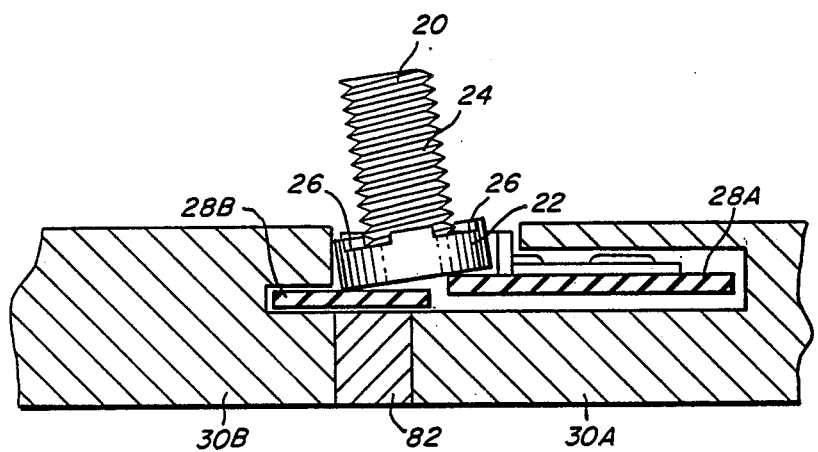
FIG. 4 is a cross-sectional view taken along line 4—4 of FIG. 3 illustrating the relationship between the pair of belts conveying the fasteners.

As illustrated in FIGS. 2, 3 and 4, an apparatus supported by frame 19 is provided to continuously and automatically coat weld studs 20 with a powder material. Such studs include head portions 22 and shank portions 24 as well as a plurality of projections 26 depending downwardly from the head portions. The apparatus is controlled at control panel 27 and includes a feeding station 29 at one end of the machine for feeding the fasteners onto a supporting member with the shanks of the fasteners directed upward. The supporting member is provided to support the fasteners in a stable position for coating. Specifically, the fasteners are positioned on their head portion 22 with the shank portion 24 projecting upward and away from the supporting member. As illustrated, the supporting member may include a pair of endless traveling belts 28A and 28B which are supported throughout a major portion of their length by support members 30A and 30B. Belt 28A moves at speeds in the range of about 0.67 inches per second to about 6.7 inches per second. Belt 28B moves at speeds in the range of about 0.67 inches per second to about 33.5 inches per second. The belt speeds are varied within these ranges to obtain the desired processing rate and, in part, rate of rotation. Head portion 22 of the fasteners rest on both belts 28A and 28B and allows the fasteners to remain in a stable position for coating.

To add to the versatility and advantages of the present invention one of the pair of belts may be wider than the other. As illustrated, belt 28A is the wider belt and is about 0.50 inches to about 1.5 inches wide and more preferably 0.75 inches to about 1.0 inch wide. The smaller belt 28B is about 0.18 inches to about 1.0 inch wide and more preferably 0.25 inches to about 0.50 inches wide. As may be appreciated by one skilled in the art, various belt widths may be used depending on the type and size of the fastener to be processed.

Furthermore, it may be desirable to provide rotation of fasteners 20 during at least a portion of their processing. To this extent, one of the pair of belts may have a coefficient of friction less than the other of the pair. This allows the belt with a higher coefficient of friction to provide a surface which engages the head of the fastener to a greater extent than the belt with the lower coefficient of friction. To maintain such coefficients of friction, belt 28A may be a glass belt impregnated with teflon to lower its coefficient of friction. Belt 28B may be a glass belt impregnated with silicon, thereby creating a higher coefficient of friction as compared with belt 28A. As may be appreciated, other types of material may be used for belts 28A and 28B and still provide the differential in coefficients of friction.

Figure 5:
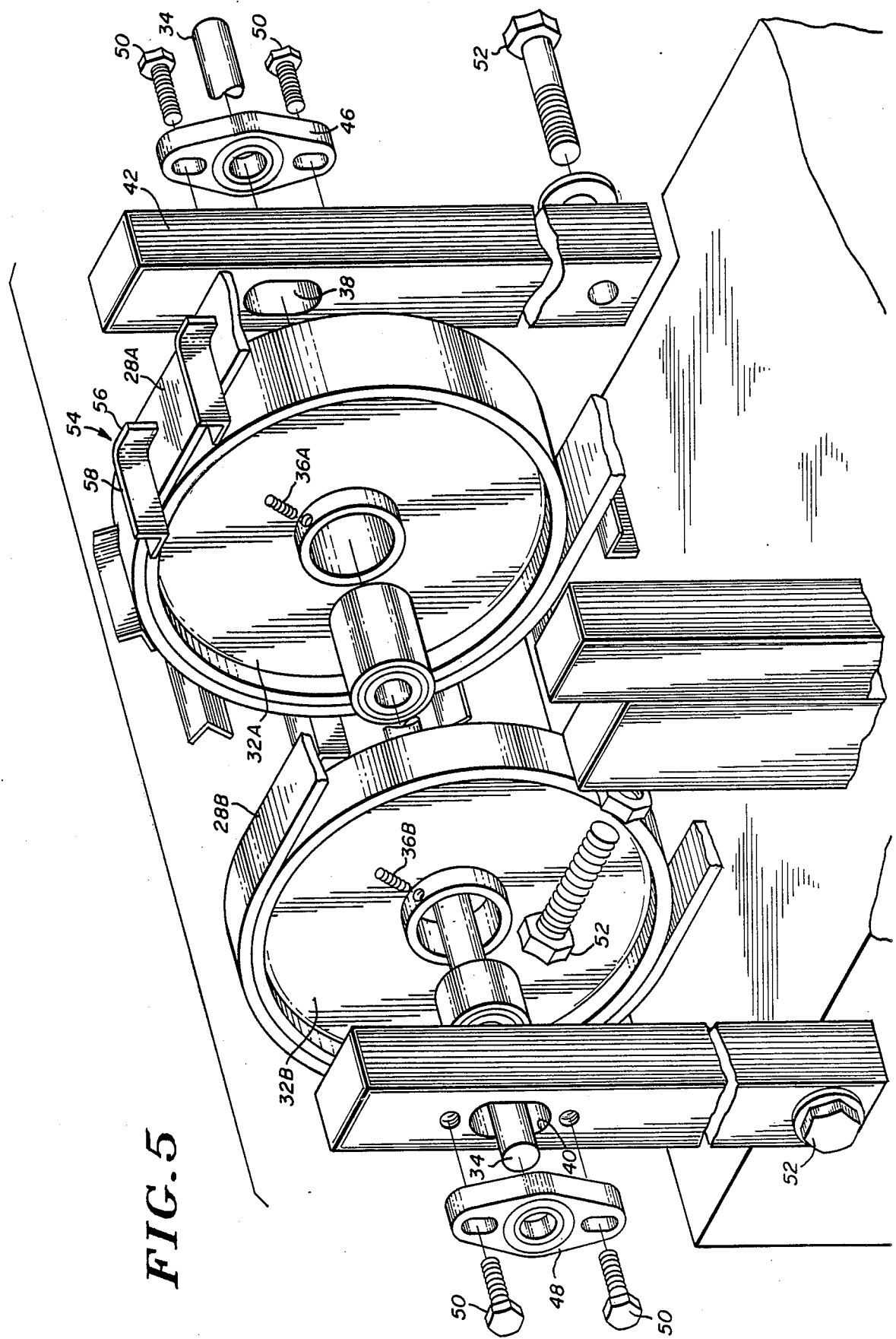
FIG. 5 is an enlarged, explode perspective view of the apparatus of FIG. 2 illustrating the belt conveying and adjusting mechanism.

As illustrated in FIGS. 2, 4 and 5, belts 28A and 28B may be completely adjustable with respect to one another, such that adjustment may be effected in height as well as the width. This provides an apparatus which will accommodate a plurality of fastener sizes, including a wide vaiety of head and shank portion diameters as well as add versatility in positioning the fastener for coating.

An example of such an arrangement is illustrated in FIG. 5 and is positioned on either end of the apparatus. Adjustability of the belts is provided through pulleys and 32A and 32B located at either end of the apparatus on which belts 28A and 28B ride, respectively. Each pulley 32A and 32B rides on shaft 34 and may be adjusted along the shaft and locked thereto through set screws 36A and 36B. Shaft 34 rides in apertures 38 and 40 in frame members 42 and 44. Bushing assemblies 46 and 48 secure shaft 34 to frame members 42 and 44 and may provide some adjustment of the shaft. Bolts 50 secure bushings 46 and 48 to frame members 42 and 44, while bolts 52 provide integrity of the frame structure of the apparatus. It may be appreciated that a variety of adjusting structures may effect the advantages of the present invention and may include, but are not limited to, adjusting support members 30A and 30B on which belts 28A and 28B ride.

As illustrated in FIG. 4, adjusting one belt higher than the other allows the fastener to be angularly positioned with respect to the coating station to aid in rotation and application of the coating material. It has been determined that a height differential of about between 0.010 inches and 0.125 inches is operable, while a height differential of about between 0.030 inches and 0.100 inches is preferable. As may be appreciated, this differential may vary depending on the size and type of fastener to be coated.

Adding to the flexibility of the present invention, belts 28A and 28B may be moved at different speeds and may also be moved in directions opposite to one another to provide rotation of the fasteners either alone or in combination with providing differential coefficients of friction for each belt. As may be appreciated by one skilled in the art, a variety of conveying methods may be employed to convey the fasteners in a linear fashion with their shank portions projecting up and down. Such methods, include but are not limited to, belts, platforms, arms and similar linear conveying structures.

As further illustrated in FIGS. 2, 3 and 4, the fasteners 20 are conveyed during movement of belts 28A and 28B, with shank portions 24 projecting upward away from the belt supports. As shown, the conveying member is illustrated as a cradle member 54 which is attached to belt 28A. Cradle member 54 includes perpendicular arms 56 and 58 which form a receiving area for head 22 of fastener 20. These arms provide perpendicular positioning of the fasteners with respect to the direction of the travel of belts 28A and 28B. Arm 56 functions as a retaining member, while arm 58 functions as the carrying surface, which provides the down line momentum for the fastener during processing.

Cradle members 54 are attached to the wider belt 28A through rivets 60 and are spaced equally along belt 28A, as shown in FIG. 3. Preferably, the spacing of cradle members 54 will be at least as wide as, and may be slightly larger than, the largest dimension of the head of the fastener. As may be appreciated, this spacing will vary with the size and type of fastener to be coated. It may be appreciated that while cradle member 54 is shown as attached to belt 28A, it may be advantageous in some instances to attach cradle members to both belts 28A and 28B. However, in the instance where it is desirable for the belts to move in opposite directions, such dual connection is not maintained. In the preferred embodiment illustrated in FIGS. 2, 3 and 4, a plurality of cradle members 54 are provided in a spaced relationship along traveling belt 28A. The cradle members accept and carry the head portions of fasteners 20 and provide downline movement of the fasteners for further processing. The downline movement provided by cradle members 54 is controlled such that the rate of advancement and rotation of the fasteners is easily adjusted and can be precisely determined.

As fasteners 20 move downline, they move through a plurality of operating stations. Specifically, the shank portions of the fasteners, which are projecting upward from belts 28A and 28B, move toward and through a first operating station having a heating element 62 which heats shank portions 24 of fasteners 20. As may be appreciated, a variety of heating elements may be utilized. Such heating elements include, but are not limited to, induction heaters, ultrasonic heaters, infrared heaters, furnaces and similar heating devices. In the preferred embodiments illustrated in FIG. 2, an induction generator 64 and associated heating coil 66 are provided. Such a heating element is preferred to efficiently heat the metallic fasteners passing through heating coil 66. In order to exhaust any residue vaporized during heating of the fasteners, vacuum port 68 is provided on one side of belts 28A and 28B.

In carrying out the present invention, fastener shank portions 24 are heated to a temperature in a range to provide flow of the material to be applied to the fastener to coat the fastener in a satisfactory manner. For example, in application of Teflon powder the temperature range is from about 570 degrees Fahrenheit to 1000 degrees Fahrenheit, and more preferably, from about 750 degrees Fahrenheit to about 850 degrees Fahrenheit. Specifically, this temperature range provides a heated fastener shank sufficiently above the melting point of the Teflon powder material and provides an acceptable coating when applied. Generator 62 includes a variable power setting which allows adjustment of the poweroutput of the generator to accommodate the desired fastener production rate. It may be appreciated by one skilled in the art, that a variety of machine parameters may be modified to attain acceptable and workable results when using the apparatus described herein as an exemplary embodiment of the present invention. Accordingly, the machine parameter ranges disclosed herein are by way of example only and are not intended to limit the present invention.

As fasteners 20 move downline from the heating station, they move to and through the powder application station in the exemplary embodiment of FIGS. 2 and 3. Specifically, the fasteners pass between a spray nozzle 70 on one side of belts 28A and 28B and a vacuum port 72 on the opposite side of belts. Coating material is supplied from reservoir 74, through conduit 76 to spray nozzle 70. As illustrated in FIG. 3, conduit 76 is attached to spray nozzle 70 through a nut 78 which terminates in a tube 80 to feed the powder to spray nozzle 70.

In order to spray the coating material on the fasteners, spray nozzle 70 is approximately 5.5 inches wide and 7.0 inches long and is positioned such that it sprays coating material across belts 28A and 28B and across the line of travel of fasteners 20. Vacuum port 72 collects any overspray of he coating material not applied to the fasteners. The distance between spray nozzle 70 and vacuum port 72 is adjustable and generally is about 1 inch and about 10 inches, and more preferably between about 2 inches and about 4 inches. As may be appreciated by those skilled in the art, distance between spray nozzle 70 and vacuum port 72 may vary according to the size and type of fastener to be coated.

The powder application station illustrated in FIGS. 2 and 3 may be similar to those disclosed in U.S. Pat. No. 3,579,684 to Richard J. Duffy. Such stations may include nozzles formed as flattened ends of tubular members secured to one end of a tubular manifold, including inlets for supplying gas under pressure to the manifolds and inlets through which plastic particles are introduced. A metered powder supply may be used to supply powder to conduits leading to the inlets as well as to the manifolds. Such a device may be arranged with a movable guide such that the powder may be directed relative to the entrance of the conduit such that one or more conduits may be supplied to provide one or more powder application stations. Particularly, spray nozzle 70 is a fan-shaped nozzle having an aperture which is in the range of about between 0.06 to about 0.25 inches wide by about 4 to about 7 inches long. As illustrated in the preferred embodiment of FIG. 2, spray nozzle 70 may be disposed at angle with respect to the axis of the shank portion of the fastener as well as at an angle with respect to the direction of travel of the belts.

When it is desired to provide a non-conductive coating on fasteners 20, it may be desirable to apply the coating material on shank portion 24 of fasteners 20 such that the material completely encircles a portion, and more preferably, the complete shank portion 24 of the fasteners. In order to accomplish this result, the apparatus of the present invention may provide for rotating the fastener shank portion at least one complete revolution during processing as described above. Such rotation may take place while applying the coating material at the powder application station. While at least one complete revolution of the fastener provides 360 degree coverage, it may be desirable to rotate the fastener more than one complete revolution during application of the coating material. Accordingly, it may be preferred to rotate the fastener as many as seven (7) to nine (9) rotations during application of the coating material.

One such method of rotating and/or aiding rotation of the fasteners includes providing a magnetic field which is imparted on the fasteners during processing, and more particularly, during the application of the powder material at the powder application station. Such a magnetic field increases the drag on a portion of the fastener aiding and/or providing rotation of the fastener. As illustrated in FIGS. 3 and 4, a plurality of equally spaced magnets 82 are embedded in support member 30B below belt 28B. Magnets 80 span the length of travel of fasteners 20 between the powder application station and may include, but are not limited to, a single strip magnet, a plurality of individual magnets, and similar magnetizing structures which may include an electromagnetic source. As illustrated in FIGS. 2 and 3, this length is that portion of the apparatus between the end of induction heating coil 66 and the end of the spray nozzle 70.

The apparatus of the present invention also includes means for removing the coated fasteners from the processing apparatus. This is illustrated as a cam member 82 which directs the processed fasteners out of cradle 54 to a discharge chute 84. At this point, the fasteners fall through a discharge conduit and are deposited into cooling tank 88. Fasteners 20 are cooled in tank 88 then packaged for subsequent shipment. A cooling tank 88 includes a cooling liquid and may also preferably include a rust inhibiting additive to prevent surface corrosion of the fasteners.

A second preferred embodiment of the present invention (not illustrated) includes apparatus imilar to that of FIGS. 2 and 3, but includes an alternative apparatus for applying the powder material from opposite sides of the fastener shank portion to effect complete 360 degree coverage of a predetermined portion or all of shank 24. This spraying arrangement includes at least two spraying stations which direct coating material from 180 degree opposite locations on either side of belts 28A and 28B. Such a configuration also provides 360 degree coating of fastener shanks 24 which may or may not be rotated as described above. As may be appreciated by one skilled in the art, this type of opposed spraying operation may take place at one or more operating stations downline of the heating operation.

Accordingly, a cost efficient, continuous method and apparatus for coating fasteners is disclosed. This type of apparatus and method will provide versatile coating of a wide variety of fasteners, including both male and female fasteners as well as fasteners including projections depending downward from the head of the fasteners.

We claim:

1. A method of coating a fastener having a head portion and shank portion with a material comprising the steps of:
    supporting the fastener for coating;
    controllably advancing the fastener for coating;
    heating the shank portion of said fastener to a temperature above the melting point of said material;
    applying said material to the heated shank portion of said fastener; and
    controllably rotating the fastener at least 360 degrees during application of said material to coat the entire circumference of at least a segment of said shank portion with said material.

2. The method of claim 1 wherein the step of rotating said fastener includes applying a magnetic field in the presence of said fastener during application of said material to at least aid in rotation of said fasteners.

3. The method of claim 1 including the step of collecting said material not applied to the fastener during the step of applying said material.

4. The method of claim 1 wherein the step of applying said material includes spraying the material on the heated shank portion of said fastener from at least two spray locations spaced from one another to effect a 360 degree coating on at least a segment of said fastener shank portion.

5. The method of claim 1 including the step of linearly conveying said fastener with said shank portion projecting upward.

6. A method of coating a fastener having a head portion and a shank portion with a material comprising the steps of:
  supporting the fastener for coating;
  controllably advancing the fastener for coating;
  heating said shank portion of said fastener to a temperature above the melting point of said material;
  applying said material from at least one spray location to the heated shank portion of said fastener; and
  controllably rotating said fastener during application of said material including the application of a magnetic field in the presence of said fastener, also during application of said material, to at least aid in rotation of said fastener so as to coat a predetermined circumference of at least a segment of said shank portion with said material.

7. The method of claim 6 wherein said step of controllably rotating said fastener includes controllably rotating said fastener at least 360 degrees during applicaton of said material.

8. The method of claim 6 wherein the step of supporting the fastener for coating includes supporting the fastener on said head portion with said shank portions projecting upward.

9. A method of coating a fastener having a head portion and a shank portion with a material comprising the steps of:
  supporting the fastener for coating with the fastener positioned on two endless moving belts, one belt having a higher coefficient of friction than the other;
  controllably advancing the fastener for coating through movement of said endless belts;
  heating said shank portion of said fastener to a temperature above the melting point of said material;
  applying said material from at least one spray location to the heated shank portion of said fastener; and
  controllably rotating said fastener at least 360 degrees during application of said material through varying the speed of said moving belts so as to coat the entire circumference of at least a segment of said shank portion with said material.

10. The method of claim 9 wherein the step of controllably rotating said fastener includes moving said moving belts in opposite directions to rotate said fastener so as to coat the entire circumference of at least a segment of said shank portion with said material.

* * * * *